United States Patent
Mese et al.

(10) Patent No.: US 10,616,409 B2
(45) Date of Patent: Apr. 7, 2020

(54) SHARING DEVICE AVAILABILITY

(71) Applicant: LENOVO (Singapore) PTE, LTD., New Tech Park (SG)

(72) Inventors: John Carl Mese, Cary, NC (US); Suzanne Marion Beaumont, Wake Forest, NC (US)

(73) Assignee: Lenovo (Singapore) PTE LTD, New Tech Park (SG)

( * ) Notice: Subject to any disclaimer, the term of this patent is extended or adjusted under 35 U.S.C. 154(b) by 60 days.

(21) Appl. No.: 14/307,247

(22) Filed: Jun. 17, 2014

(65) Prior Publication Data

US 2015/0365818 A1 Dec. 17, 2015

(51) Int. Cl.
| | | |
|---|---|---|
| *H04M 3/42* | (2006.01) | |
| *H04W 8/22* | (2009.01) | |
| *G06F 21/30* | (2013.01) | |
| *H04W 4/12* | (2009.01) | |
| *H04L 29/08* | (2006.01) | |

(52) U.S. Cl.
CPC ...... *H04M 3/42382* (2013.01); *G06F 21/305* (2013.01); *H04L 67/24* (2013.01); *H04L 67/303* (2013.01); *H04W 4/12* (2013.01); *H04W 8/22* (2013.01); *G06F 2221/2103* (2013.01)

(58) Field of Classification Search
None
See application file for complete search history.

(56) References Cited

U.S. PATENT DOCUMENTS

| | | | | |
|---|---|---|---|---|
| 8,064,934 B2* | 11/2011 | Klassen | ................... | H04L 51/04 455/420 |
| 2003/0236086 A1* | 12/2003 | Litwin, Jr. | ............ | H04M 1/663 455/412.1 |
| 2006/0002536 A1* | 1/2006 | Ambrose | ................ | H04M 1/56 379/201.01 |
| 2006/0023865 A1* | 2/2006 | Nice | .................... | H04M 3/5232 379/265.04 |
| 2006/0052061 A1* | 3/2006 | Klassen | ................ | H04L 12/581 455/67.11 |
| 2007/0130260 A1* | 6/2007 | Weintraub | ........ | H04L 29/06027 709/204 |
| 2008/0155471 A1* | 6/2008 | Lynn | ............... | H04M 1/274583 715/811 |
| 2009/0030992 A1* | 1/2009 | Callanan | .............. | G06Q 10/107 709/206 |
| 2009/0088144 A1* | 4/2009 | Beadle | .................... | H04L 67/24 455/419 |
| 2009/0089804 A1* | 4/2009 | Beadle | .................... | H04L 67/24 719/318 |
| 2009/0107265 A1* | 4/2009 | Parker, II | .......... | H04M 3/42374 73/866.1 |

(Continued)

FOREIGN PATENT DOCUMENTS

WO    WO 2009/153537 A1 * 12/2009    .............. H04M 3/42

*Primary Examiner* — Chirag G Shah
*Assistant Examiner* — Suk Jin Kang
(74) *Attorney, Agent, or Firm* — Kunzler Bean & Adamson

(57) ABSTRACT

A method, apparatus, and program product are disclosed for determining an availability status associated with an information handling device, generating a message comprising information regarding the availability status, the message being one or more of a voice message and a textual message, and sending the message to one or more contacts associated with the information handling device.

20 Claims, 6 Drawing Sheets

(56) References Cited

U.S. PATENT DOCUMENTS

| | | | | |
|---|---|---|---|---|
| 2009/0131034 A1* | 5/2009 | Klassen | H04L 12/581 | 455/418 |
| 2011/0231396 A1* | 9/2011 | Dhara | H04L 12/1818 | 707/731 |
| 2011/0269439 A1* | 11/2011 | Griffin | G06Q 10/107 | 455/415 |
| 2012/0094640 A1* | 4/2012 | Klassen | H04L 12/581 | 455/414.1 |
| 2012/0274725 A1* | 11/2012 | Robertson | H04L 12/1818 | 348/14.01 |
| 2012/0297305 A1* | 11/2012 | Hehmeyer | H04L 51/043 | 715/733 |
| 2013/0217364 A1* | 8/2013 | Varoglu | H04L 67/24 | 455/414.1 |
| 2013/0225210 A1* | 8/2013 | Rosener | H04M 1/6066 | 455/458 |
| 2014/0108565 A1* | 4/2014 | Griffin | G06Q 10/107 | 709/206 |
| 2014/0329515 A1* | 11/2014 | Bluvband | H04L 12/5835 | 455/418 |
| 2014/0337448 A1* | 11/2014 | Kline | H04W 4/12 | 709/206 |
| 2015/0009273 A1* | 1/2015 | Robertson | H04L 12/1818 | 348/14.03 |
| 2015/0131559 A1* | 5/2015 | Becker Hof | H04L 5/0053 | 370/329 |
| 2015/0215413 A1* | 7/2015 | Lindner | H04L 67/24 | 709/224 |
| 2015/0271110 A1* | 9/2015 | Murray | H04L 51/02 | 455/414.1 |
| 2015/0350457 A1* | 12/2015 | Lauer | H04M 15/735 | 455/408 |
| 2016/0014056 A1* | 1/2016 | Griffin | G06Q 10/107 | 709/206 |
| 2016/0072955 A1* | 3/2016 | Barkan | H04M 3/42212 | 455/417 |
| 2016/0330154 A1* | 11/2016 | Rosen | H04L 51/36 | |
| 2019/0020612 A1* | 1/2019 | Rosen | H04L 51/36 | |

* cited by examiner

SHARING DEVICE AVAILABILITY

FIELD

The subject matter disclosed herein relates to device communications and more particularly relates to determining and sharing the communication availability of a device.

BACKGROUND

Description of the Related Art

Information handling devices, such as smart phones and tablet computers, may communicate with each other using a variety of communication protocols. For example, users may communicate using smart phones via voice calls, text messages, email messages, etc. However, many of the communication protocols may involve some form of asynchronous communication. In such a scenario, a message sender may be uncertain about when an intended receiver may respond. There may be extenuating circumstances, unknown to the message sender, surrounding the intended receiver's ability to respond within a timely manner.

BRIEF SUMMARY

A method for sharing device availability is disclosed. An apparatus and computer program product also perform the functions of the method. In one embodiment, a method includes determining, by a processor, an availability status associated with an information handling device. A method, in another embodiment, includes generating a message comprising information regarding the availability status. In certain embodiments, the message includes one or more of a voice message and a textual message. In yet another embodiment, a method includes sending the message to one or more contacts associated with the information handling device.

A method, in one embodiment, further includes detecting a triggering event that changes the availability status associated with the information handling device. In some embodiments, the availability status associated with the information handling device is determined in response to detecting the triggering event. In certain embodiments, the triggering event comprises detecting a change in the network connectivity of the information handling device. In another embodiment, the triggering event comprises detecting a contextual event associated with the information handling device. In a further embodiment, the triggering event comprises detecting a battery of the information handling device has a battery life below a predetermined threshold.

In one embodiment, the textual message is sent using a protocol selected from the group consisting of email, short message service ("SMS"), instant message ("IM"), and application notification. In another embodiment, the method further includes selecting the one or more contacts based on a communication history between the one or more contacts and the information handling device. In some embodiments, the communication history comprises information associated with one or more contacts that have communicated with the information handling device within a predetermined period of time before determining the availability status.

In yet another embodiment, the method includes collecting metadata associated with a communication history between the information handling device and the one or more contacts. In certain embodiments, the method includes determining whether to send the message to a contact of the one or more contacts based on the metadata. In some embodiments, the metadata comprises information associated with the response time of a user of the information handling device, the information comprising one or more of an average response time, a minimum response time, and a maximum response time. In one embodiment, the message is sent to a contact of the one or more contacts using the same message protocol as a message received from the contact.

An apparatus is provided that includes a processor and a memory that stores code executable by the processor. In one embodiment, the code determines an availability status associated with an information handling device. In some embodiments, the code generates a textual message comprising information regarding the availability status. In a further embodiment, the code sends the message to one or more contacts associated with the information handling device.

In one embodiment, the code detects a triggering event that changes the availability status associated with the information handling device. In some embodiments, the availability status associated with the information handling device is determined in response to detecting the triggering event. The triggering event, in one embodiment, comprises detecting a change in the network connectivity of the information handling device. In another embodiment, the triggering event comprises detecting a contextual event associated with the information handling device. In a further embodiment, the triggering event comprises detecting a battery of the information handling device has a battery life below a predetermined threshold.

In certain embodiments, the textual message is sent using a protocol selected from the group consisting of email, short message service ("SMS"), instant message ("IM"), and application notification. In some embodiments, the code further selects the one or more contacts based on a communication history between the one or more contacts and the information handling device. In one embodiment, the code collects metadata associated with a communication history between the information handling device and the one or more contacts and determines whether to send the message to a contact of the one or more contacts based on the metadata.

A computer program product is provided that, in one embodiment, includes a computer readable storage medium that stores code executable by a processor to perform operations. In one embodiment, the operations include determining an availability status associated with an information handling device. In certain embodiments, the operations include generating a textual message comprising information regarding the availability status. In one embodiment, the textual message is sent using one or more of an email protocol and a short message service ("SMS") protocol. In a further embodiment, the operations include sending the message to one or more contacts associated with the information handling device.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
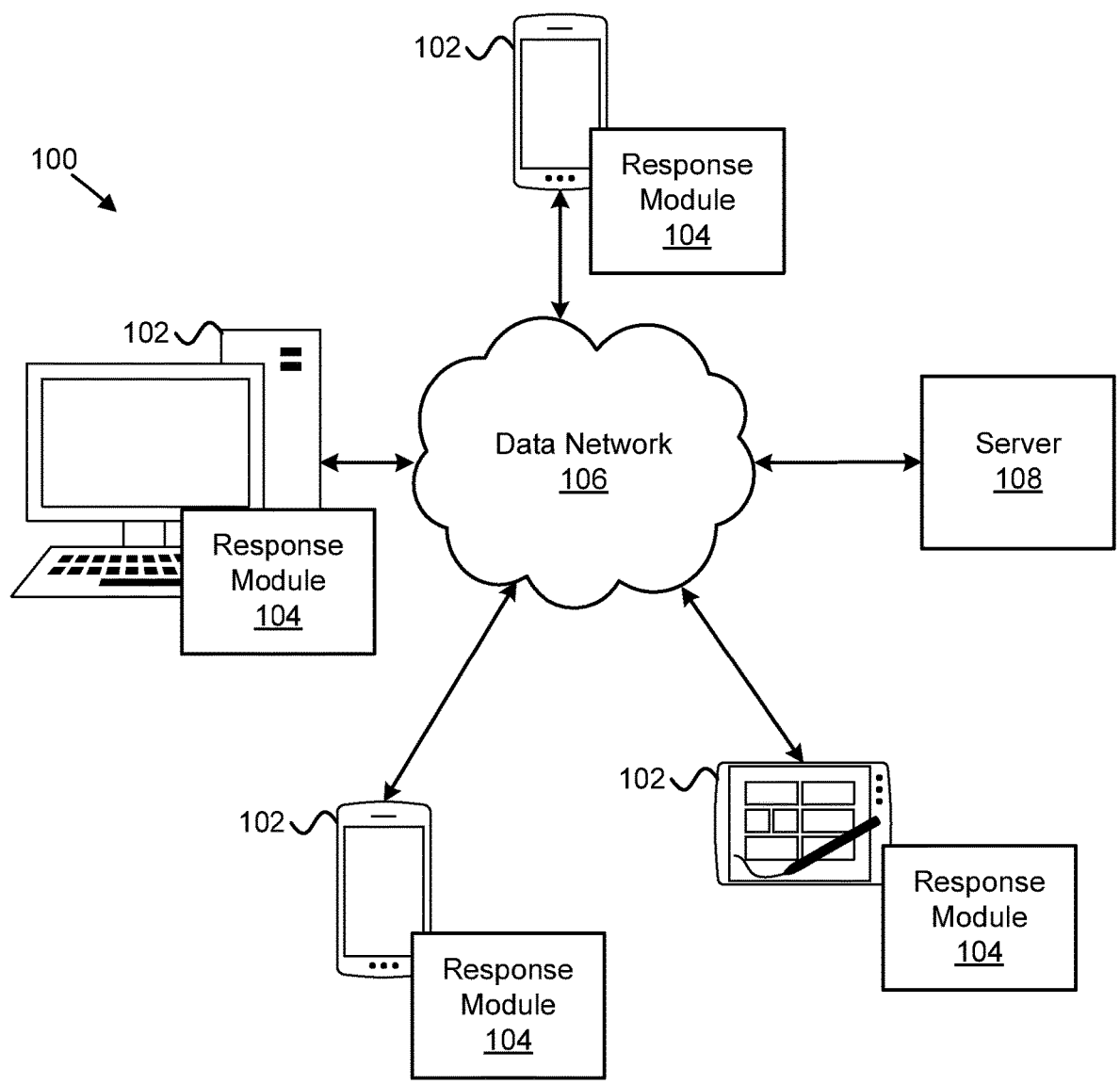
FIG. 1 is a schematic block diagram illustrating one embodiment of a system for sharing device availability.

As will be appreciated by one skilled in the art, aspects of the embodiments may be embodied as a system, method or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, comprise one or more physical or logical blocks of executable code which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be written in any combination of one or more programming languages, including an object oriented programming language such as Java, Smalltalk, C++ or the like and conventional procedural programming languages, such as the "C" programming language or similar programming languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. These code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which comprises one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

FIG. 1 depicts a system 100 for sharing device availability. In one embodiment, the system 100 includes a plurality of information handling devices 102, one or more response modules 104, a network 106, and a server 108, which are described in more detail below. Even though a certain number of information handling devices 102, response modules 104, data networks 106, and servers 108 are depicted in FIG. 1, any number of these elements may be present in the system 100.

In one embodiment, the system 100 includes a plurality of information handling devices 102. In certain embodiments, an information handling device 102 includes an electronic device comprising a processor and memory, such as a desktop computer, a laptop computer, a smart phone, a tablet computer, a smart TV, an eBook reader, a smart watch, an optical head-mounted display, a beacon, and/or the like. In one embodiment, two or more information handling devices 102 are communicatively connected using the data network 106. In some embodiments, the information handling devices 102 send and/or receive voice data, such as phone calls, voice messages, or the like.

In another embodiment, the information handling devices 102 send and/or receive text-based messages, such as short message service ("SMS") messages, instant messaging ("IM") messages, chat messages, email messages, and/or the like. In a further embodiment, the information handling devices 102 execute an application to send and/or receive text-based messages, such as a text messaging program, an instant messaging program, a chat program, an email client, a game, and/or the like, which may incorporate a response module 104.

In certain embodiments, the information handling devices 102 include a touch-enabled display, a physical keyboard, a microphone, a digital camera, and/or the like, which allows a user to interact with the information handling device 102. In some embodiments, the information handling devices 102 include one or more sensors that detect various contexts, inputs, or the like, such as proximity sensors, location sensors, motion sensors, biometric sensors, and/or the like.

In one embodiment, the system 100 includes one or more response modules 104 that proactively send a message, such as a voice or textual message, to other interested information handling devices 102 in response to the availability of the information handling device 102 changing. For example, as described in more detail below, the response module 104 may send a message in anticipation of the strength of the network connectivity of the information handling device 102 becoming weak. In another embodiment, at least a portion of the response module 104 is located on an information handling device 102 and/or the server 108. In certain embodiments, the response module 104 includes a plurality of modules to perform the operations of determining an availability status associated with the information handling device 102, generating a message comprising information regarding the availability status, and sending the message to one or more contacts associated with the information handling device 102. The response module 104, and its associated modules, are described in more detail below with reference to FIGS. 2 and 3.

In certain embodiments, the system 100 includes a data network 106. The data network 106, in one embodiment, is a digital communication network that transmits digital communications related to an automated messaging response system 100. The data network 106 may include a wireless network, such as a wireless cellular network, a local wireless network, such as a Wi-Fi network, a Bluetooth® network, and the like. The data network 106 may include a wide area network ("WAN"), a storage area network ("SAN"), a local area network ("LAN"), an optical fiber network, the internet, or other digital communication network. The data network 106 may include two or more networks. The data network 106 may include one or more servers, routers, switches, and/or other networking equipment. The data network 106 may also include computer readable storage media, such as a hard disk drive, an optical drive, non-volatile memory, random access memory ("RAM"), or the like.

The system 100, in another embodiment, includes a server 108. The server 108, in some embodiments, includes a main frame computer, a desktop computer, a laptop computer, a cloud server, a virtual server, and/or the like. In certain embodiments, the server 108 includes at least a portion of the response module 104. In another embodiment, the information handling device 102 is communicatively coupled to the server 108 through the data network 106. In certain embodiments, the information handling device 102 offloads at least a portion of the information processing associated with the response module 104 to the server 108.

Figure 2:
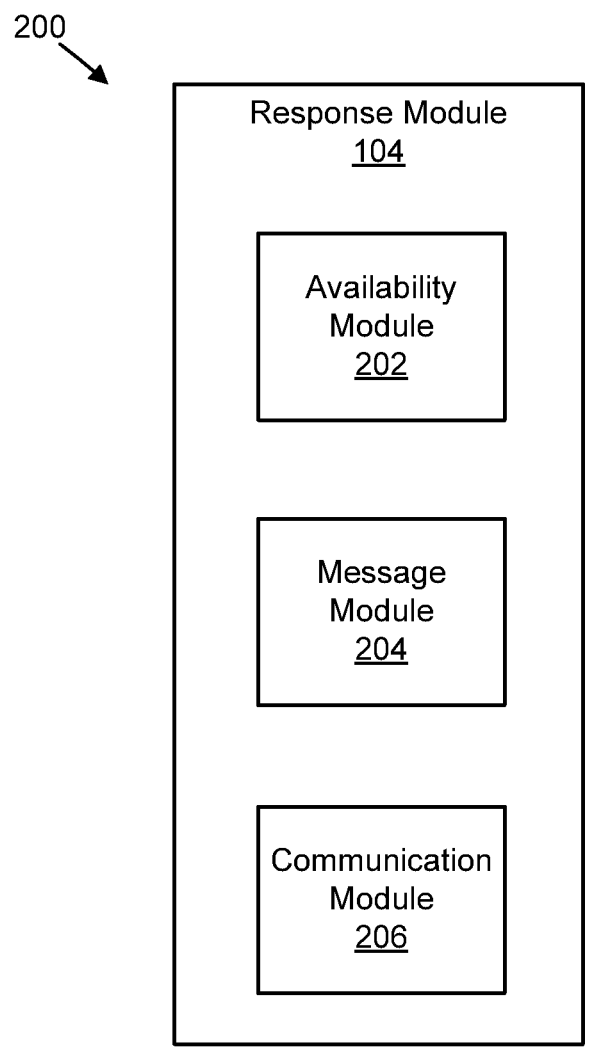
FIG. 2 is a schematic block diagram illustrating one embodiment of a module for sharing device availability.

FIG. 2 depicts one embodiment of a module 200 for sharing device availability. In one embodiment, the module 200 includes an embodiment of a response module 104. The response module 104, in certain embodiments, includes an availability module 202, a message module 204, and a communication module 206, which are described in more detail below.

The availability module 202, in one embodiment, determines an availability status associated with an information handling device 102. As used herein, the availability status, in some embodiments, indicates the ability of the information handling device 102 to send and/or receive communications. The availability status may indicate the information handling device 102 is either available or not. In another embodiment, the availability status may comprise a range of availability indicators, such as full availability, partial availability, no availability, and/or the like. In certain embodiments, the availability status reflects an anticipated availability for the information handling device 102. For example, the availability module 202 may determine the availability status associated with an information handling device 102 is "unavailable" in response to determining the information handling device 102 will lose network connectivity in the near future.

For example, the availability module 202 may determine that the availability status associated with a smart phone in airplane mode (i.e., in a mode where the communication functionality of the information handling device 102 is suspended) is "unavailable" while the availability status associated with the smart phone may be "available" when not in airplane mode. In another example, the availability module 202 may determine that the availability status associated with a smart phone with a weak network connection is "partially available," while the availability status may be "available" for a strong network connection (or a network connection above a predetermined threshold) or "unavailable" if the smart phone does not have a network connection (or has a network connection below a predetermined threshold).

In some embodiments, the availability module 202 determines an availability of an information handling device 102 based on a plurality of settings, characteristics, and/or the like associated with the information handling device 102. For example, even though a smart device may have a strong network connection, if its battery is nearly depleted, the availability module 202 may determine that the availability status associated with the smart device is "unavailable." In some embodiments, the availability status includes additional data associated with the availability status, such as a description for why the information handling device 102 is in an available/unavailable state, characteristics and/or settings of the information handling device 102 that may affect the availability status associated with the information handling device 102, and/or the like. For example, the availability status may state "unavailable—no signal," "unavailable in 10 minutes—dead battery," "available for 30 more minutes," or the like. In some embodiments, the availability module 202 determines or estimates the amount of time that the information handling device 102 will be unavailable. In such an embodiment, the availability module 202 reports the estimated duration that the information handling device 102 will be unavailable as part of the availability status.

In one embodiment, in order to determine the availability of the information handling device 102 based on contextual information, the availability module 202 uses one or more sensors of the information handling device 102, such as location sensors (e.g., global positioning system ("GPS") sensors), proximity sensors (e.g., infrared sensors), motion sensors (e.g., accelerometers, gyroscopes, etc.), or the like. In some embodiments, the availability module 202 uses applications executing on the information handling device 102, and their associated data, to determine the availability status associated with the information handling device 102 based on contextual information, such as a calendar application, a task application, an email application, and/or the like.

In one embodiment, the message module 204 generates a message comprising information regarding the availability status determined by the availability module 202. The message generated by the message module 204, in certain embodiments, comprises a textual message. For example, if the availability status is "unavailable," such as if the information handling device 102 about to lose network connectivity, the message module 204 may create a text message stating "Unavailable—no network connection," which may be sent to other information handling devices 102 that have text message capabilities. The message module 204 may create textual messages for various communication protocols, such as short message server ("SMS"), instant message ("IM"), email, and/or the like. In certain embodiments, the message module 204 creates textual messages for an application notification, such as a notification sent to a contact from within a smart phone application, a computer program, and/or the like. For example, the message module 204 may create a message to be sent from within the smart phone game to a contact playing the smart phone game with the user of the information handling device 102. In some embodiments, the message generated by the message module 204 comprises a voice message. For example, the message module 204 may create a voice message comprising availability status information that may be sent to information handling devices 102 with voice capabilities.

In certain embodiments, the message module 204 determines to create a textual message, a voice message, or the like, based on a communication history with one or more contacts associated with the information handling device 102. For example, if a particular contact communicates with the information handling device 102 via text message, the message module 204 may create a text message to be sent to the information handling device 102. In some embodiments, the message module 204 determines the type of message to create based on characteristics of the information handling device 102, such as network connectivity strength, battery life, location, and/or the like. For example, if it requires more battery power to generate a voice message instead of a text message, the message module 204 may decide to create the text message in order to conserve battery life.

In one embodiment, the message generated by the message module 204 includes a description of the availability status associated with the information handling device 102. For example, the message may state the availability status, such as "unavailable" and also any descriptions, explanations, or the like, associated with the availability of the information handling device 102. Thus, in addition to the availability status, the message module 204 may also include a time frame in the message that describes when the information handling device 102 may become available or unavailable. Similarly, the message module 204 may include an explanation of the availability state in the message, such as "no network connection," "intermittent network connection," "low battery life," "in airplane mode," "powering off," or the like.

The communication module 206, in one embodiment, sends the message generated by the message module 204 to one or more contacts associated with the information handling device 102. In certain embodiments, the communication module 206 sends the message using a default message protocol according to the capabilities of the information handling device 102 and/or the capabilities of the information handling devices 102 that receive the message. For example, the communication module 206 may default to sending the message as an SMS message. However, if the information handling device 102 does not support sending SMS messages, or a recipient information handling device 102 does not support receiving SMS messages, the communication module 206 may default to a different message protocol, such as an email or instant message, or a voice message.

In one embodiment, the communication module 206 sends the message using the same message protocol that was previously used between two or more information handling devices 102. For example, if smart phone A and smart phone B had most recently used text messages to communicate, the communication module 206 may send a message from smart phone A to smart phone B using SMS. Similarly, if smart phone A and smart phone B were most recently used to have a telephone conversation, the communication module 206 may send a voice message from smart phone A to smart phone B. In certain embodiments, the communication module 206 uses a plurality of communication protocols to send a message via multiple channels. For example, the communication module 206 may send a text message and an email message to notify a contact of the availability status associated with an information handling device 102.

In certain embodiments, the communication module 206 sends the message to one or more contacts associated with the information handling device 102. The one or more contacts, in one embodiment, comprise different information handling devices 102 that have been in communication with the information handling device 102 that is sending the message. In some embodiments, the communication module 206 determines whether the contacts have communicated with the information handling device 102 during a predetermined time period, such as within the last 30 minutes, the last 60 minutes, or the like. For example, if a user is having an ongoing conversation with another user via their smart phones, the communication module 206 may send a message if one of the smart phones loses network connectivity in order to notify the other user that the smart phone has lost the connection to the network. On the other hand, if a user had a phone conversion with another user last week, the communication module 206 may not send a message at this time. The manner in which the contacts are determined is discussed below in reference to the contacts module 304. In certain embodiments, the communication module 206 sends a message to a contact in response to the contact attempting to communicate with the information handling device 102 during the unavailability of the information handling device 102. For example, if the information handling device 102 is unavailable due to an event on the device's 102 calendar, such as a meeting, the communication module 206 may send a message to a contact attempting to communicate with the device 102 notifying them that the user is in a meeting and will be unavailable until a certain time.

In one embodiment, the communication module 206 receives confirmation from a user before sending the message. For example, the communication module 206 may prompt the user to confirm sending the message before the message is sent. In some embodiments, the communication module 206 sends at least some messages without requiring the user's input, such as when the information handling device 102 is placed in airplane mode, when the information handling device 102 is about to power down, and/or the like, which may not need the confirmation of the user. In such an embodiment, the user may specify which situations require confirmation and which situations do not require confirmation.

In some embodiments, the communication module 206 maintains a queue of messages that are not sent to the one or more contacts due to the unavailability of the information handling device 102. For example, the communication module 206 may not be able to send messages to contacts of the information handling device 102 if the information handling device 102 has a weak or an intermittent network connection. In such an embodiment, the communication module 206 may queue the messages and send them as the information handling device 102 gains availability during the event. If the event that caused the unavailability of the information handling device 102 has completed, in certain embodiments, the communication module 206 clears the queue by removing or deleting messages from the queue.

In certain embodiments, the response module 104 provides a mechanism for proactively providing a communication response before the information handling device 102 becomes unavailable. Similarly, the response module 104 may proactively provide a communication response in response to the information handling device 102 becoming available. In this manner, contacts that are in communication with the information handling device 102 may not be left waiting for a response when a user of an unavailable information handling device 102 is unable to respond.

Figure 3:
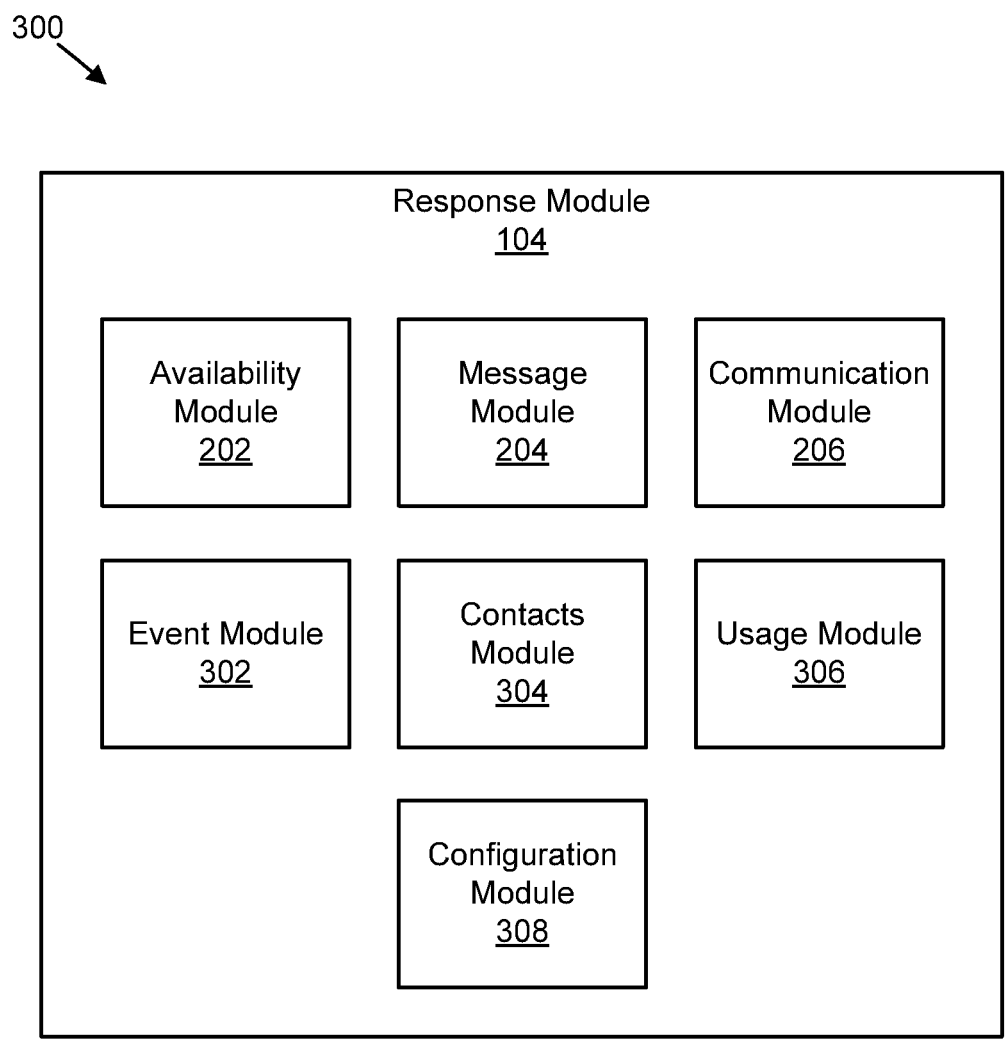
FIG. 3 is a schematic block diagram illustrating one embodiment of another module for sharing device availability.

FIG. 3 depicts an embodiment of a module 300 for sharing device availability. In one embodiment, the module 300 includes an embodiment of a response module 104. The response module 104, in certain embodiments, includes an availability module 202, a message module 204, and a communication module 206, which may be substantially similar to the availability module 202, the message module 204, and the communication module 206 described above with reference to FIG. 2. In one embodiment, the response module 104 includes an event module 302, a contacts module 304, a usage module 306, and a configuration module 308, which are described in more detail below.

The event module 302, in one embodiment, detects a triggering event that changes the availability status associated with the information handling device 102. In certain embodiments, the availability module 202 determines the availability status associated with the information handling device 102 in response to the detected triggering event. In one embodiment, the triggering event comprises detecting a change in the network connectivity of the information handling device 102. For example, the event module 302 may detect when the information handling device 102 loses or gains signal strength. In such an embodiment, the event module 302 may notify the availability module 202 that the availability status associated with the information handling device 102 has changed. In certain embodiments, the event module 302 determines whether the information handling device's 102 network connection strength is above or below a predetermined threshold before notifying the availability module 202.

In one embodiment, the event module 302 detects the information handling device 102 is being placed in airplane mode, which may disable or suspend the communication functions of the device and render the information handling device 102 unavailable. In another embodiment, the event module 302 detects when the information handling device 102 transitions from one network to another network. In such an embodiment, the transition between networks may improve or worsen the network connectivity of the information handling device 102. The event module 302 may also determine whether the change in networks causes a change in the availability status associated with the information handling device 102.

Similarly, the event module 302, in certain embodiments, detects changes in the health of the network that the information handling device 102 is connected to. In one embodiment, even though the information handling device 102 has a strong connection to the network, the health of the network may not be reliable due to factors such as malfunctioning network hardware, high network traffic, or the like. The event module 302 may determine whether the health of the network is below a reliable threshold and notifies the availability module 202 that messages sent from the information handling device 102 will be slow or will not be sent at all. For example, the network health may be low at a sporting event, concert, or other event where the network traffic is high because of the large number of information handling devices 102 that may be competing for the network's bandwidth.

In another embodiment, the event module 302 detects a contextual event associated with the information handling device 102, which may cause a change in the availability status associated with the information handling device 102. The contextual event may include a calendar event, a motion event, a location event, and/or the like. For example, if a user has a meeting scheduled in a calendar application executing on the information handling device 102, the event module 302 may notify the availability module 202 that the user has a meeting and will be unavailable while in the meeting.

In another embodiment, the event module 302 detects that the information handling device 102 is in motion (using one or more motion sensors of the information handling device 102), such as if the user is driving a car, and will notify the availability module 202 that the user is unavailable. In another embodiment, the event module 302 detects the user is walking, jogging, or otherwise exercising by using one or more sensors of the information handling device 102, such as pedometers, accelerometers, biometric sensors, and/or location sensors. For example, the event module 302 may use a combination of the pedometer and the biometric sensor (e.g., a heart rate monitor) to detect the user is jogging and will be unavailable.

In yet another embodiment, the event module 302 may detect that the user is at a location with intermittent or unreliable network connectivity, using GPS sensors of the information handling device 102, or the like, such that the response time of the information handling device 102 would be unreasonably slow. For example, the event module 302 may detect that the user is in an area where there is little to no network connectivity, such as a rural area, an underground area, and/or the like.

In yet another embodiment, the event module 302 detects that the information handling device 102 is about to power down or shut off. In one embodiment, the event module 302 detects the battery life of the information handling device 102 is below a predetermined threshold and notifies the availability module 202 that the information handling device 102 will be unavailable because the battery is nearly depleted. In certain embodiments, the event module 302 detects the information handling device 102 is about to be powered down, such as in response to a user shutting down the device 102. In such an embodiment, the event module 302 notifies the availability module 202 that the information handling device 102 will be unavailable because the information handling device 102 will be turned off.

In one embodiment, the contacts module 304 selects one or more contacts associated with the information handling device 102 to send the message to. A contact, as used herein, is a person who has communicated with the information handling device 102 or is otherwise associated with the user of the information handling device 102. The one or more contacts, in certain embodiments, are associated with different information handling devices 102. The contacts module 304, in certain embodiments, selects a contact from a list of contacts stored on the information handling device 102. In another embodiment, the contacts module 304 selects a contact based on the information handling device's 102 communication with the contact. Thus, the contact may not be stored on the information handling device 102, but the information handling device 102 may nevertheless have a communication history with the contact. The contacts module 304, in some embodiments, selects contacts from a user's social media network (e.g., a list of Facebook® friends or Twitter® followers), an email contact list, an instant message contact list, and/or the like.

In one embodiment, the contacts module 304 selects one or more contacts based on a communication history between the one or more contacts and the information handling device 102. In some embodiments, the communication history comprises information associated with one or more contacts who have communicated with the information handling device 102 within a predetermined period of time before the availability module 202 determines the availability status. For example, the contacts module 304 may select a contact if the information handling device 102 has communicated with the contact within the last hour. In one embodiment, the contacts module 304 selects contacts based on a frequency of communication between the information handling device 102 and the contacts being above a predetermined threshold (e.g., once a day, once an hour, or the like). For example, if a contact communicates with the information handling device 102 at least once each day, the contacts module 304 may select the contact if the frequency of communication is above the predetermined threshold. On the other hand, if the contact only communicates with the information handling device 102 once a week, the contacts module 304 may not select the contact because the frequency of communication may not be above the predetermined threshold.

In another embodiment, the contacts module 304 selects contacts who have a regular or scheduled communication with the information handling device 102. For example, if the only communication a contact has with the information handling device 102 is a regularly sent text message on a Monday morning, the contact module 304 may select the contact if the information handling device 102 is unavailable on Monday morning, whereas the same contact may not be selected if the information handling device 102 is unavailable on a Thursday evening.

In certain embodiments, the contacts module 304 determines the one or more contacts based on the estimated duration of the unavailability of the information handling device 102. For example, if the estimated unavailability duration of the information handling device 102 is short, e.g., an hour, the contacts module 304 may select contacts that have recently communicated with the information handling device 102, e.g., within the last thirty minutes, the last hour, or the like. However, if the estimated unavailability duration of the information handling device 102 is much longer, e.g., a week, the contacts module 304 may select contacts who have previously, but not necessarily recently, communicated with the information handling device 102. Therefore, in this example, a contact who has most recently communicated with the information handling device 102 a few days ago may be selected by the contacts module 304.

In some embodiments, the contacts module 304 selects contacts from one or more applications executing on the information handling device 102. For example, if a user is playing a game on a smart phone over a network with one or more other users, the contacts module 304 may select the one or more other users as contacts to receive the message indicating the unavailability of the information handling device 102. Similarly, when the information handling device 102 becomes available again, the contacts module 304 may select the same users as contacts to receive a message indicating the availability of the information handling device 102.

The contacts module 304, in certain embodiments, maintains contact groups and notifies the communication module 206 to send messages to one or more groups of contacts. In certain embodiments, the message module 204 may customize messages for certain groups of contacts. For example, the message module 204 may include a more formal message for contacts in a work group than for contacts in a family or friends group. The contacts module 304 may associated contacts with certain groups in response to user input. In a further embodiment, the contacts module 304 automatically generates groups based on information associated with the contacts, such as social media information (e.g., connections between friends, family members, co-workers, etc.), communication data, user-defined groups, and/or the like.

In one embodiment, the usage module 306 collects metadata associated with a communication history between the information handling device 102 and the one or more contacts for a predetermined period of time. The communication history, in certain embodiments, includes metadata describing the response time between the information handling device 102 and the one or more contacts, such as the average, minimum, and/or maximum response times. The usage module 306, in some embodiments, presents this information to the user and/or the one or more contacts. For example, the usage module 306 may display the average response time between users on a user's information handling device 102 in order to assist a contact in determining when to anticipate a response from a user and/or whether the user is unavailable.

In certain embodiments, the response metadata collected by the usage module 306 is used by the contacts module 304 to determine which contacts to select to receive the message based on the calculated response times. For example, if the estimated unavailability duration is 15 minutes, but the average response time between the user and a particular contact is 30 minutes, the contacts module 304 may not select the particular contact to receive the message because the contact may not expect a response from the user within the 15 minutes that the information handling device 102 is unavailable. However, if the estimated unavailability duration is 30 minutes, and the average response time between the user and a particular contact is 10 minutes, the contacts module 304 may select the particular contact to receive the message because it expects a response from the user within the 30 minutes that the information handling device 102 is unavailable.

In some embodiments, the usage module 306 tracks the trending communication history between the information handling device 102 and the one or more contacts for a predetermined period of time. For example, the usage module 306 may determine that the trending average response time between users has decreased from 15 minutes to 5 minutes, which may indicate that the users are actively communicating. In another example, the usage module 306 may determine that the average response time between users is 5 minutes between 8 AM and 5 PM, but then it goes up to 30 minutes after 5 PM, which may indicate that the users more actively communicate during business hours than in the evening. The contacts module 304, in one embodiment, may use this metadata to determine whether to send the message to a contact of the one or more contacts.

In one embodiment, the configuration module 308 configures the content of the message based on various inputs. In some embodiments, the configuration module 308 configures the message in response to user input. For example, a user may specify the content of a textual message, including whether to include location information, activity information, signal strength information, response time data, battery life information, and/or the like. Instead of the message simply stating "unavailable," for example, the reason for the unavailability may be included in the message—"unavailable—in airplane mode." Additionally, the configuration module 308 may include the estimated duration of the unavailability may be included: "unavailable—in airplane mode for 3 hours." In an embodiment that sends a voice message, the configuration module 308 may record a user's custom voice message such that the user can customize the voice message using his own voice.

The configuration module 308, in certain embodiments, maintains a plurality of messages that may be used in different contexts. For example, the configuration module 308 may maintain default textual and voice messages that may be used for different triggering events. Thus, there may be a default message that is used when the phone is place in airplane mode and a different default message that is used when the battery of the information handling device 102 is nearly exhausted. The configuration module 308, in some embodiments, maintains a plurality of custom messages created by a user and may replace one or more default messages with the user's custom messages.

Figure 4A:
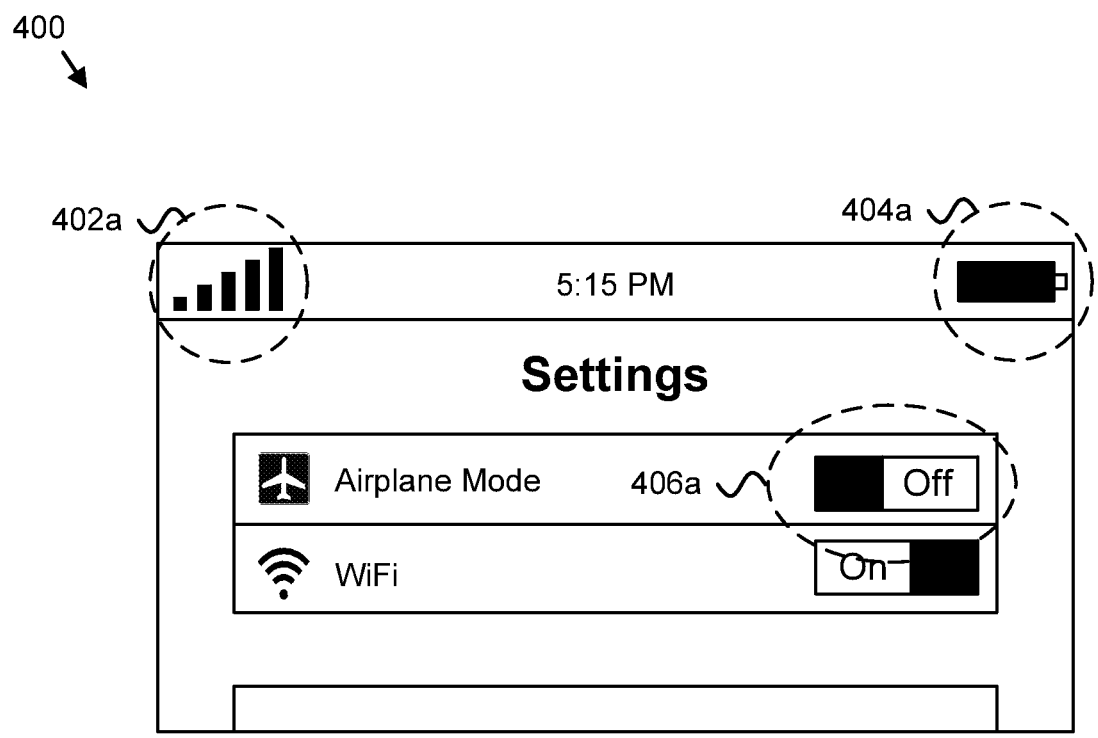
FIG. 4A is an illustration of an embodiment of an interface associated with an information handling device.
Figure 4B:
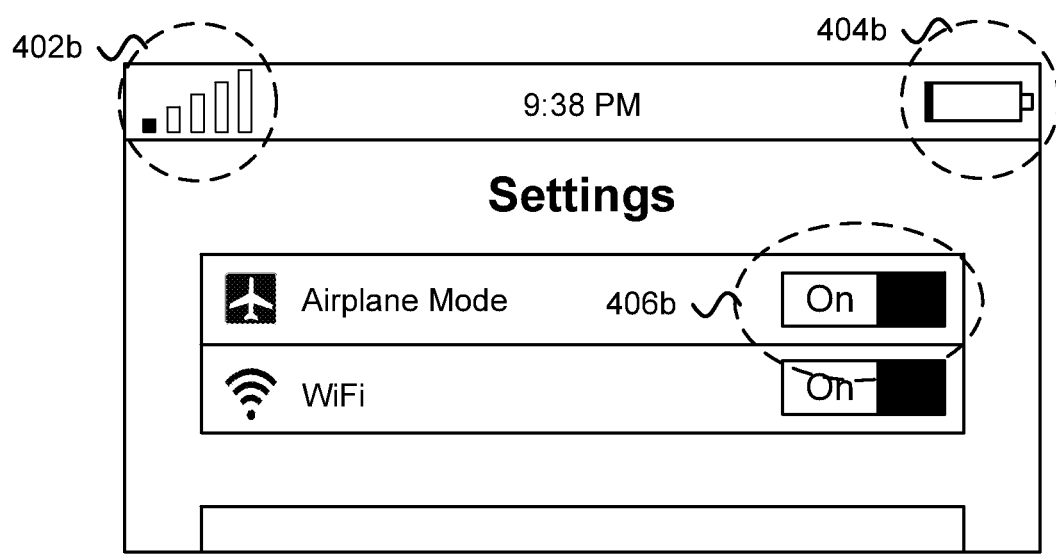
FIG. 4B is an illustration of an embodiment of another interface associated with an information handling device.

FIGS. 4A and 4B depict one embodiment of an interface 400 for an information handling device 102. In the depicted embodiment, the interface 400 may be for an information handling device 102 embodied as a smart phone. The interface 400 includes various indicators, such as a signal strength indicator 402*a-b* and a battery life indicator 404*a-b*. Additionally, the interface 400 includes a switch 406*a-b* that a user can interact with to turn airplane mode on and off.

In one embodiment, the event module 302 detects a change in the network signal strength, as indicated by the signal strength indicator 402*a-b*. As depicted in FIG. 4A, the smart phone has a strong connection to the network, as indicated by the five solid bars of the signal strength indicator 402*a*. However, FIG. 4B depicts the smart phone having a weak, if any, connection to the network, as indicated by the single solid bar of the signal strength indicator 402*b*.

In one embodiment, the event module 302 detects the change in signal strength, a triggering event, and notifies the availability module 202. The availability module 202, in response to the triggering event, may determine the availability status associated with the smart phone, which may be determined to be "unavailable" due to having a weak or no network connection. The message module 204 may generate a voice or textual message describing the unavailability state of the smart phone and the communication module 206 may send the message to one or more contacts, as determined by the contacts module 304.

Similarly, the event module 302 may detect that the battery life of the battery for the smart phone is below a predetermined threshold, as indicated by the battery life indicator 404*a-b*. As depicted in FIG. 4A, the smart phone has a full battery, as indicated by the solid battery indicator 404*a*. However, FIG. 4B depicts the smart phone having a low, almost dead, battery, as indicated by the empty battery life indicator 404*b*.

In one embodiment, the event module 302 detects the battery life is nearly exhausted, a triggering event, and notifies the availability module 202. The availability module 202, in response to the triggering event, may determine the availability status associated with the smart phone, which may be determined to be "unavailable" due to having low battery life. The message module 204 may generate a voice or textual message describing the unavailability state of the smart phone and the communication module 206 may send the message to one or more contacts, as determined by the contacts module 304.

In another embodiment, the interface 400 includes a switch 406*a-b* that turns the smart phone's airplane mode on and off. FIG. 4A depicts the airplane mode switch 406*a* in "Off" mode, meaning the communication functions of the smart phone are fully enabled. FIG. 4B depicts the airplane mode switch 406*b* in "On" mode, meaning the communication functions of the smart phone are suspended or disabled.

In one embodiment, the event module 302 detects the smart phone being switched between airplane mode and non-airplane mode, which comprises a triggering event. The availability module 202, in response to the triggering event, may determine the availability status associated with the smart phone, which may be determined to be "unavailable" if in airplane mode or "available" if airplane mode is disabled. The message module 204 may generate a voice or textual message describing the unavailability state of the smart phone and the communication module 206 may send the message to one or more contacts, as determined by the contacts module 304.

Figure 5:
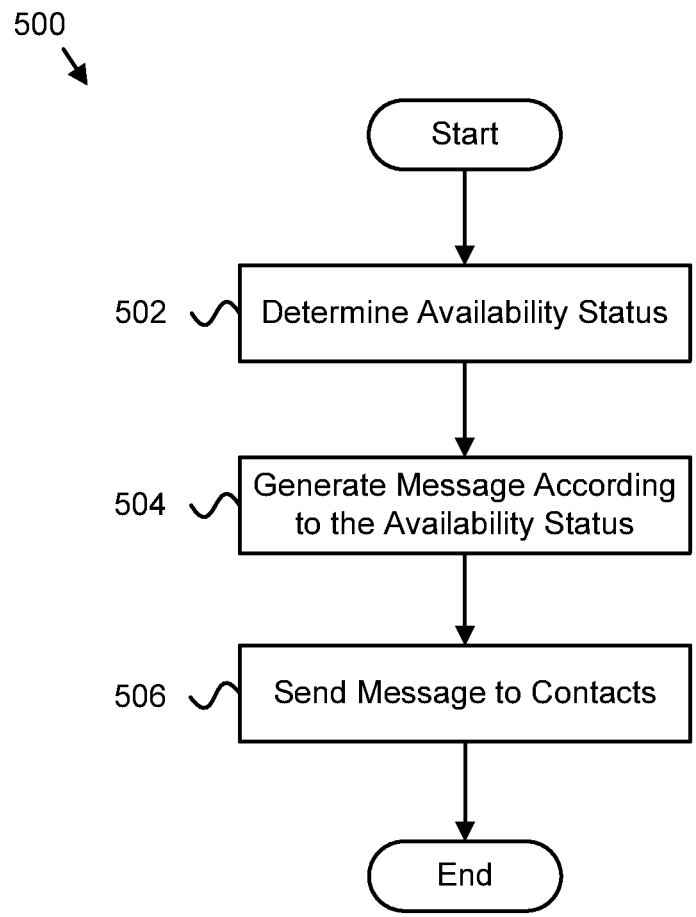
FIG. 5 is a schematic flow chart diagram illustrating one embodiment of a method for sharing device availability.

FIG. 5 depicts one embodiment of a method 500 for sharing device availability. In one embodiment, the method 500 begins and the availability module 202 determines 502 an availability status associated with an information handling device 102. In certain embodiments, the message module 204 generates 504 a message comprising information regarding the availability status as determined by the availability module 202. The communication module 206 sends 506 the message generated by the message module 204 to one or more contacts associated with the information handling device 102, and the method 500 ends.

Figure 6:
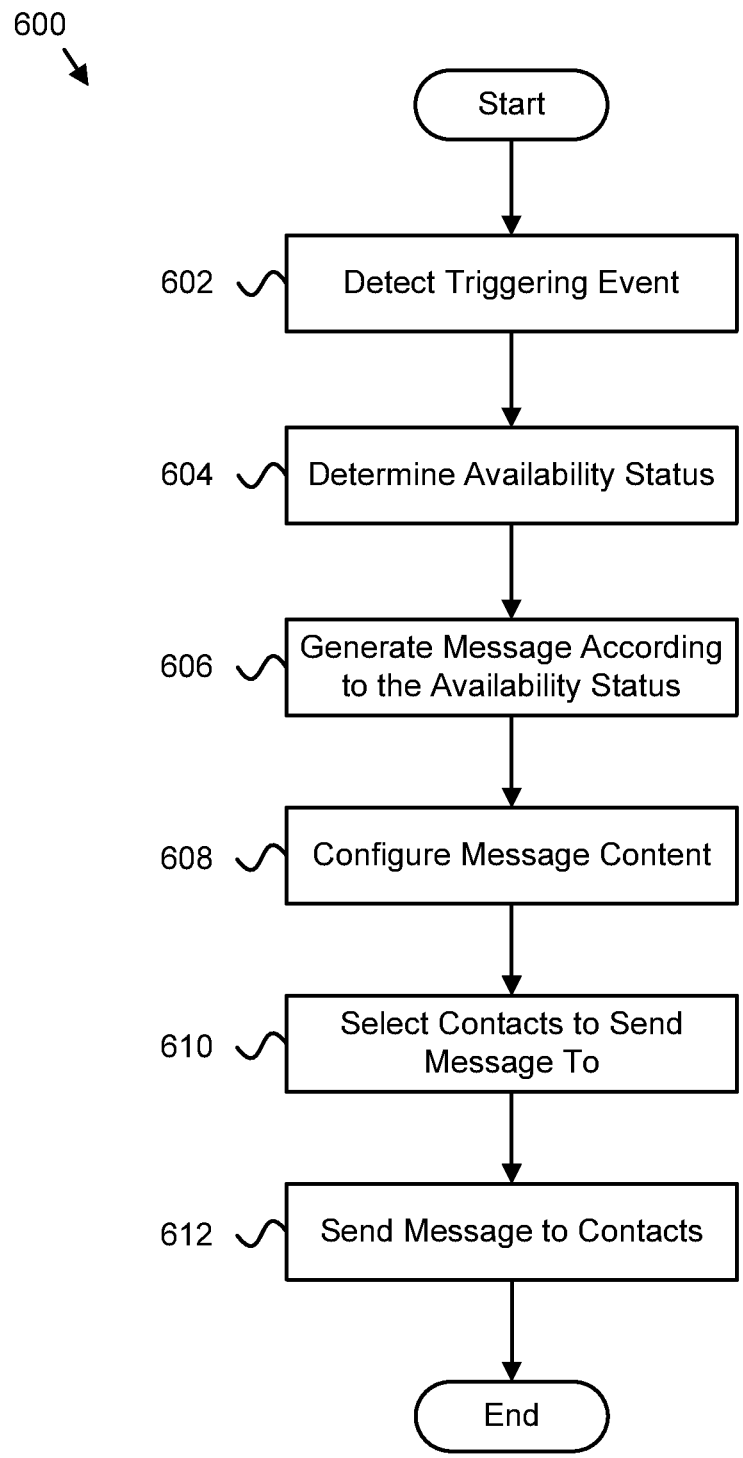
FIG. 6 is a schematic flow chart diagram illustrating one embodiment of another method for sharing device availability.

FIG. 6 depicts one embodiment of another method 600 for sharing device availability. In one embodiment, the method 600 begins and the event module 302 detects 602 a triggering event that changes the availability status associated with the information handling device 102. In some embodiments, the triggering event comprises a change in the information handling device's 102 network connectivity strength, a change in the health of the network, changing the airplane mode status of the information handling device 102, the information handling device's 102 battery life going below or above a predetermined threshold, a calendar event, a change in the information handling device's 102 location, a change in the biometric characteristics of a user, and/or the like.

In some embodiments, the availability module 202 determines 604 the availability status associated with the information handling device 102. In certain embodiments, the availability module 202 determines the availability status associated with the information handling device 102 in response to the detected triggering event. In one embodiment, the message module 204 generates 606 a message comprising information regarding the availability status determined by the availability module 202. The message generated 606 by the message module 204, in certain embodiments, comprises a textual message. In some embodiments, the message generated 606 by the message module 204 comprises a voice message. In one embodiment, the message generated 606 by the message module 204 includes a description of the availability status associated with the information handling device 102

The configuration module 308, in certain embodiments, configures 608 the content of the message based on various inputs. In some embodiments, the configuration module 308 configures 608 the message in response to user input. A user may determine the content of the message and any details to be included, such as the reason for the availability status that is being conveyed in the message. For example, a user may configure a custom message to be sent right before she enters a meeting. The custom message may state: "Sorry I won't be available for the next 30 minutes. I will be in a meeting. I will be available again soon."

The contacts module 304, in one embodiment, selects 610 one or more contacts associated with the information handling device 102 to send the message to. The contacts module 304, in certain embodiments, selects 610 a contact from a list of contacts stored on the information handling device 102. In another embodiment, the contacts module 304 selects 610 a contact based on the information handling device's 102 previous communication with the contact. The contacts module 304, in some embodiments, selects 610 contacts from a user's social media network (e.g., a list of Facebook® friends or Twitter® followers), an email contact list, an instant message contact list, and/or the like. In certain embodiments, the contacts module 304 selects 610 the one or more contacts based on the estimated duration of the unavailability of the information handling device 102. In some embodiments, the contacts module 304 selects 610 contacts from one or more applications, such as games, chat programs, or the like, executing on the information handling device 102.

The communication module 206, in certain embodiments, sends 612 the message generated by the message module 204 to the one or more contacts selected 610 by the contacts module 304. In certain embodiments, the communication module 206 sends the message using a default message protocol according to the capabilities of the information handling device 102 and/or the capabilities of the information handling devices 102 that receive the message. In one embodiment, the communication module 206 sends the message using the same message protocol that was previously used between two or more information handling devices 102. The communication module 206, in certain embodiments, receives confirmation from a user before sending the message, and the method 600 ends.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method comprising:
   determining, by a processor, an availability status associated with an information handling device in response to detecting a triggering event affecting the availability of the information handling device, the triggering event causing the information handling device to become unavailable for communication;
   determining an estimated time frame for how long the information handling device will be unavailable;
   generating a message comprising an explanation for the availability status, the explanation including the estimated time frame for how long the information handling device will be unavailable;
   determining one or more contacts associated with the information handling device to send the message to as a function of the estimated time frame for how long the information handling device will be unavailable and based on an average response time for the one or more contacts, wherein the determined one or more contacts previously communicated with the information handling device within a recent time period that is less than or equal to the estimated time frame and have an average response time that is less than or equal to the estimated time frame;
   sending the message to the one or more contacts associated with the information handling device before the information handling device becomes unavailable; and
   sending, in response to the information handling device becoming available after the period of time that the information handling device is unavailable, a second message to the one or more contacts indicating that the information handling device is available.

2. The method of claim 1, wherein the message comprises one or more of a voice message and a textual message.

3. The method of claim 2, wherein the textual message is sent using a protocol selected from the group consisting of email, short message service ("SMS"), instant message ("IM"), and application notification.

4. The method of claim 1, further comprising detecting a triggering event that changes the availability status associated with the information handling device, wherein the availability status associated with the information handling device is determined in response to detecting the triggering event.

5. The method of claim 4, wherein the triggering event comprises detecting a contextual event associated with the information handling device.

6. The method of claim 1, further comprising selecting the one or more contacts based on a communication history between the one or more contacts and the information handling device.

7. The method of claim 6, wherein the communication history comprises information associated with one or more contacts that have communicated with the information handling device within a predetermined period of time before determining the availability status.

8. The method of claim 1, further comprising:
   collecting metadata associated with a communication history between the information handling device and the one or more contacts; and
   determining whether to send the message to a contact of the one or more contacts based on the metadata.

9. The method of claim 8, wherein the metadata comprises information associated with the response time of a user of the information handling device, the information comprising one or more of an average response time, a minimum response time, and a maximum response time.

10. The method of claim 1, wherein the message is sent to a contact of the one or more contacts using the same message protocol as a message received from the contact.

11. The method of claim 1, wherein the triggering event comprises determining that the information handling device is being placed in airplane mode.

12. The method of claim 1, wherein the triggering event comprises determining that the information handling device is disconnected from a first network and connected to a second network.

13. The method of claim 1, wherein determining a reliability status of the network comprises determining a traffic level of the network.

14. The method of claim 1, wherein the triggering event comprises determining that a user is exercising based on a plurality of sensors associated with the information handling device, the plurality of sensors comprising motion sensors and biometric sensors.

15. An apparatus comprising:
   a processor;
   a memory that stores code executable by the processor, the code comprising:
   code that determines an availability status associated with an information handling device in response to detecting a triggering event affecting the availability of the information handling device, the triggering event causing the information handling device to become unavailable for communication;
   code that determines an estimated time frame for how long the information handling device will be unavailable;
   code that generates a textual message an explanation for the availability status, the explanation including the estimated time frame for how long the information handling device will be unavailable;
   code that determines one or more contacts associated with the information handling device to send the message to as a function of the estimated time frame for how long the information handling device will be unavailable and based on an average response time for the one or more contacts, wherein the determined one or more contacts previously communicated with the information handling device within a recent time period that is less than or equal to the estimated time frame and have an average response time that is less than or equal to the estimated time frame;

code that sends the message to the one or more contacts associated with the information handling device before the information handling device becomes unavailable; and code that sends, in response to the information handling device becoming available after the period of time that the information handling device is unavailable, a second message to the one or more contacts indicating that the information handling device is available.

16. The apparatus of claim 15, further comprising code that detects a triggering event that changes the availability status associated with the information handling device, wherein the availability status associated with the information handling device is determined in response to detecting the triggering event.

17. The apparatus of claim 16, wherein the triggering event comprises detecting a contextual event associated with the information handling device.

18. The apparatus of claim 15, wherein the textual message is sent using a protocol selected from the group consisting of email, short message service ("SMS"), instant message ("IM"), and application notification.

19. The apparatus of claim 15, further comprising:
code that collects metadata associated with a communication history between the information handling device and the one or more contacts; and
code that determines whether to send the message to a contact of the one or more contacts based on the metadata.

20. A program product comprising a non-transitory computer readable storage medium that stores code executable by a processor to perform:

determining an availability status associated with an information handling device in response to detecting a triggering event affecting the availability of the information handling device, the triggering event causing the information handling device to become unavailable for communication;

determining an estimated time frame for how long the information handling device will be unavailable;

generating a textual message comprising an explanation for the availability status, the explanation including the estimated time frame for how long the information handling device will be unavailable, the textual message being sent using one or more of an email protocol and a short message service ("SMS") protocol;

determining one or more contacts associated with the information handling device to send the message to as a function of the estimated time frame for how long the information handling device will be unavailable and based on an average response time for the one or more contacts, wherein the determined one or more contacts previously communicated with the information handling device within a recent time period that is less than or equal to the estimated time frame and have an average response time that is less than or equal to the estimated time frame;

sending the message to the one or more contacts associated with the information handling device before the information handling device becomes unavailable; and sending, in response to the information handling device becoming available after the period of time that the information handling device is unavailable, a second message to the one or more contacts indicating that the information handling device is available.

* * * * *